United States Patent
Aminpour

(10) Patent No.: US 9,895,819 B1
(45) Date of Patent: Feb. 20, 2018

(54) CONTINUOUS FEED FABRIC CUTTING

(71) Applicant: Amazon Technologies, Inc., Seattle, WA (US)

(72) Inventor: Rouzbeh Safavi Aminpour, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/069,855

(22) Filed: Mar. 14, 2016

(51) Int. Cl.
| | | |
|---|---|---|
| *G06F 19/00* | (2011.01) | |
| *B26D 5/00* | (2006.01) | |
| *B23K 26/402* | (2014.01) | |
| *B23K 26/08* | (2014.01) | |
| *B23K 26/03* | (2006.01) | |
| *B23K 103/00* | (2006.01) | |

(52) U.S. Cl.
CPC .......... *B26D 5/005* (2013.01); *B23K 26/032* (2013.01); *B23K 26/0344* (2015.10); *B23K 26/0838* (2013.01); *B23K 26/402* (2013.01); *B23K 2203/38* (2015.10)

(58) Field of Classification Search
CPC .. B23K 26/03; B23K 26/032; B23K 26/0344; B26D 5/005; B26D 5/007
USPC ........................................................ 700/134
See application file for complete search history.

(56) References Cited

U.S. PATENT DOCUMENTS

| | | | | |
|---|---|---|---|---|
| 4,178,820 A | * | 12/1979 | Gerber ..................... | B26D 5/00 700/167 |
| 5,132,505 A | * | 7/1992 | Zonneveld ............ | B28D 1/221 219/121.6 |
| 5,172,326 A | | 12/1992 | Campbell, Jr. et al. | |
| 5,254,833 A | * | 10/1993 | Okiyama ............. | B28D 5/0005 219/121.68 |
| 5,333,111 A | * | 7/1994 | Chaiken ................... | B26D 5/00 382/111 |
| 5,418,711 A | * | 5/1995 | Pomerleau ............... | B26D 5/00 700/134 |

(Continued)

FOREIGN PATENT DOCUMENTS

WO 2016/033367 3/2016

OTHER PUBLICATIONS

U.S. Appl. No. 14/970,840, filed Dec. 16, 2015, Final Office Action dated Feb. 24, 2017.

(Continued)

*Primary Examiner* — Nathan Durham
(74) *Attorney, Agent, or Firm* — Eversheds Sutherland (US) LLP

(57) ABSTRACT

Aspects of continuous feed fabric cutting are described. In one example, a system includes a textile cutter having a cutting table and a laser cutting assembly. The laser cutting assembly includes a set of laser cut modules arranged in a row to provide a combined laser cutting span across at least a portion of the cutting table. The laser cut modules provide respective laser cutting spans which, collectively, form the combined laser cutting span across the cutting table. As a textile sheet is fed across the cutting table of the textile cutter, one or more textile panels or pieces of fabric can be cut out from the textile sheet using laser beams along the region where the textile sheet intersects or crosses the combined laser cutting span. The laser cutting assembly can provide continuous cutting as a sheet is being fed across the cutting table.

20 Claims, 9 Drawing Sheets

(56) References Cited

U.S. PATENT DOCUMENTS

| | | | |
|---|---|---|---|
| 5,709,506 A | | 1/1998 | Beard et al. |
| 5,791,215 A | | 8/1998 | Morrison et al. |
| 5,806,390 A | * | 9/1998 | Pomerleau ............... B26D 5/00 700/130 |
| 5,867,392 A | * | 2/1999 | Bousquet ............... A41H 3/007 700/134 |
| 5,975,743 A | | 11/1999 | Bercaits |
| 6,028,320 A | | 2/2000 | Uhling |
| 6,173,211 B1 | | 1/2001 | Williams et al. |
| 6,349,241 B1 | | 2/2002 | Peron et al. |
| 6,502,489 B2 | * | 1/2003 | Gerent ................... B26D 5/00 700/134 |
| 6,520,057 B1 | * | 2/2003 | Steadman ............... B26D 5/00 700/134 |
| 6,807,289 B2 | | 10/2004 | Zink |
| 6,836,694 B1 | * | 12/2004 | Podubrin ............... B23K 26/04 700/134 |
| 7,003,370 B2 | | 2/2006 | Rapoza |
| 8,428,767 B2 | | 4/2013 | Tremoureux et al. |
| 8,731,703 B1 | | 5/2014 | Lehrer et al. |
| 8,838,482 B2 | | 9/2014 | Schindler et al. |
| 2007/0107572 A1 | | 5/2007 | Pommier |
| 2013/0144424 A1 | | 6/2013 | Jarbouai |
| 2013/0261785 A1 | | 10/2013 | Crary et al. |
| 2014/0277663 A1 | | 9/2014 | Gupta et al. |
| 2014/0277683 A1 | | 9/2014 | Gupta et al. |
| 2015/0066189 A1 | | 3/2015 | Mulligan et al. |

OTHER PUBLICATIONS

U.S. Appl. No. 14/970,840, filed Dec. 16, 2015, Response to Non-Final Office Action filed on Nov. 14, 2016.

U.S. Appl. No. 14/970,874, filed Dec. 16, 2015, Response to Non-Final Office Action filed on Nov. 9, 2016.

U.S. Appl. No. 14/970,840, filed Dec. 16, 2015, Office Action dated Aug. 16, 2016.

U.S. Appl. No. 14/970,874, filed Dec. 16, 2015, Office Action dated Aug. 11, 2016.

PCT Patent Application PCT/US17/016802 filed on Feb. 7, 2017, Notification of Transmittal of the International Search Report and the Written Opinion of the International Searching Authority, or the Declaration dated May 10, 2017.

PCT Patent Application PCT/US17/020334 filed on Mar. 2, 2017, Notification of Transmittal of the International Search Report and the Written Opinion of the International Searching Authority, or the Declaration dated Jun. 8, 2017.

* cited by examiner

CONTINUOUS FEED FABRIC CUTTING

CROSS-REFERENCE TO RELATED APPLICATIONS

This application is related to U.S. patent application Ser. No. 14/970,874, filed Dec. 16, 2015, titled "On Demand Apparel Manufacturing" ("the '874 Application") and U.S. patent application Ser. No. 14/970,840, filed Dec. 16, 2015, titled "On Demand Apparel Panel Cutting" ("the '840 Application"), the entire disclosure of each of which related applications is hereby fully incorporated herein by reference. This application is also related to U.S. patent application Ser. No. 15/069,849, filed on Mar. 14, 2016, titled "Automated Fabric Picking", and U.S. patent application Ser. No. 15/069,867, filed on Mart. 14, 2016, titled "Organized Assembly Instruction Printing and Referencing", the entire disclosure of each of which related applications is hereby fully incorporated herein by reference.

BACKGROUND

The apparel manufacturing industry includes a diverse range of parties, such as designers, fabric manufacturers, and apparel cutting and sewing workers, for example. The apparel manufacturing industry relies upon various resources, processes, and equipment to produce finished garments, accessories, footwear, etc. Generally, a process to manufacture a garment includes garment design, fabric production and/or printing, panel cutting, and sewing together the final garment. Many aspects of apparel manufacturing processes are relatively time consuming and require the coordination of many different geographically-dispersed suppliers, vendors, manufacturers, and retailers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
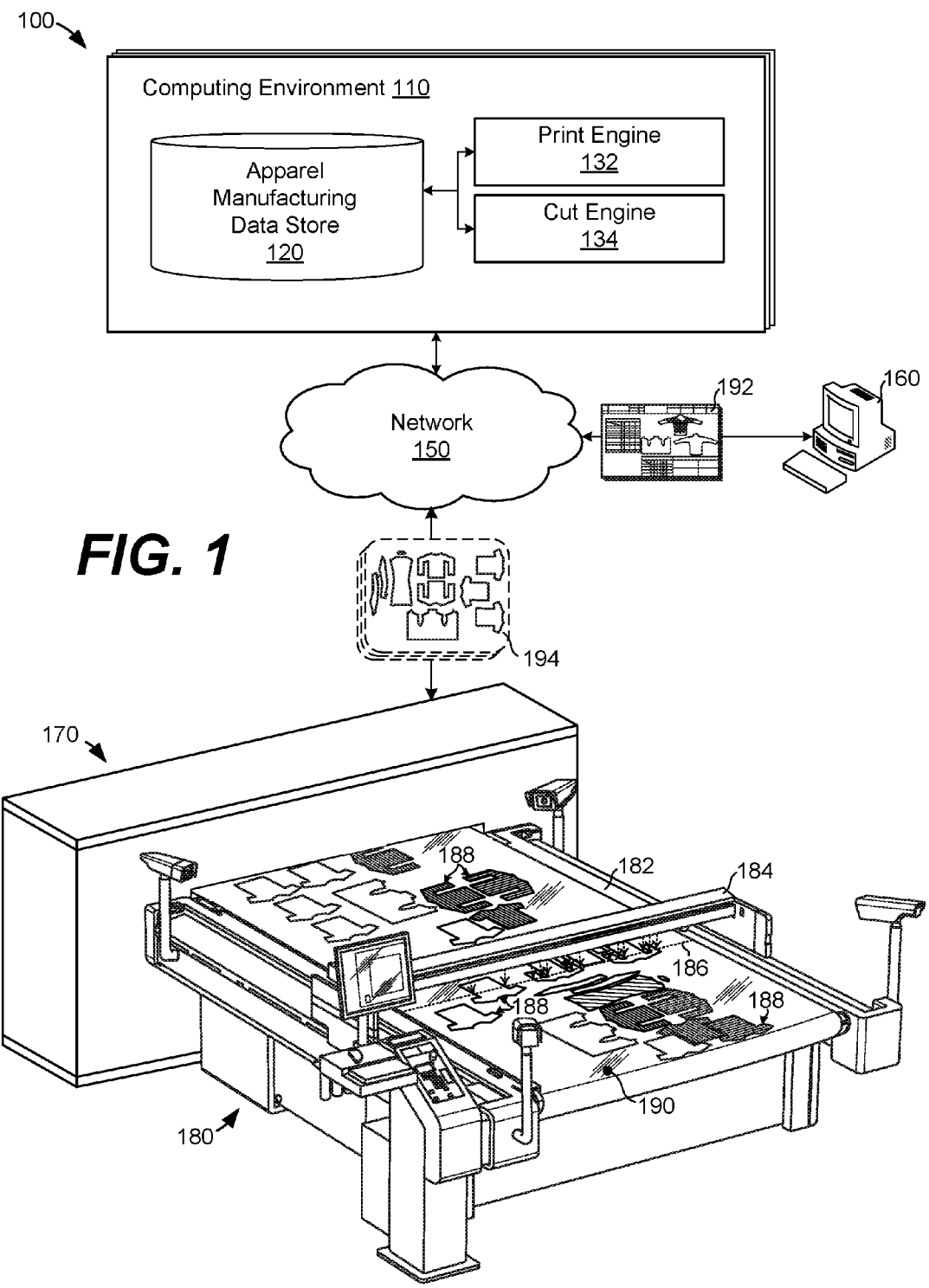
FIG. 1 illustrates a networked environment for continuous fabric cutting according to various embodiments of the present disclosure.

Aspects of continuous feed fabric cutting are described herein. In one example, a system includes a textile cutter having a cutting table and a laser cutting assembly. The laser cutting assembly includes a set of laser cut modules arranged in a row to provide a laser cutting span across at least a portion of the cutting table. Individual ones of the laser cut modules provide respective cutting spans across the cutting table. Collectively, the cutting spans combine to form a combined laser cutting span across the cutting table. As a textile sheet is continuously fed across the cutting table of the textile cutter, one or more textile panels or pieces of fabric can be cut out from the textile sheet using one or more laser beams along the region where the textile sheet intersects or crosses the combined laser cutting span of the laser cutting assembly.

To control the operation of the laser cutting assembly to cut textile panels out from a textile sheet, the system also includes a computing device configured to identify panel cutouts on the textile sheet as it is being fed over and across the cutting table. The textile sheet can be pulled or fed directly over the cutting table from a textile printer in one example. In addition to being able to identify panel cutouts on the textile sheet, the computing device is also configured to track various points of intersection of the panel cutouts with the combined laser cutting span (and the timings of those points of intersection) as a function of the shapes of the panel cutouts and a feed rate of the textile sheet across the cutting table. Based on this tracking, the computing device is configured to direct or instruct the laser cutting assembly to cut the panel cutouts out from the textile sheet.

In other aspects, the computing device associated with the cutting table and laser cutting assembly is further configured to calculate a cutting rate for the laser cutting assembly based at least in part on a power level of a laser source in the laser cutting assembly and a type of the textile sheet being cut. The computing device can then determine whether, along any length of a panel cutout, the cutting rate is insufficient to cut the panel cutout out from the textile sheet. If so, the computing device can also adjust operating parameters associated with the laser cutting assembly to increase the cutting rate, as necessary, to ensure that one or more panels are cut out from the textile sheet.

As compared to other cutting systems in which a textile sheet cannot be continuously fed across a cutting table during cutting operations, the cutting table and laser cutting assembly described herein can be used to provide continuous fabric cutting as a textile sheet is being fed across the cutting table. The cutting table and laser cutting assembly can be relied upon to cut various panels out from a larger textile sheet at a faster rate than other systems, increasing the throughput and reducing costs for apparel manufacturing processes.

Before turning to the figures, it is noted that the embodiments are not limited to the manufacture of any particular type(s) of textile, fabric, or clothing products from any particular type(s) of materials. Instead, the concepts described herein can be applied to the manufacture of a wide array of products, including clothing or fabric products, accessories (e.g., scarves, gloves, hats, bags, belts, etc.), footwear, bedding, curtains, towels, etc., in a wide variety of materials, including but not limited to paper, plastic, leather, rubber, and other materials. Thus, references to textiles or textile sheets are not intended to be limiting as to the types of materials that can be cut using the concepts described herein.

Turning to the figures, FIG. 1 illustrates a networked environment 100 for continuous fabric cutting according to various embodiments of the present disclosure. The networked environment 100 includes a computing environment 110. The computing environment 110 includes an apparel manufacturing data store 120, a print engine 132, and a cut engine 134. The networked environment 100 also includes a network 150, one or more client devices 160, a textile printer 170, and a textile cutter 180. The textile cutter 180 includes a cutting table 182 and a laser cutting assembly 184 that provides a combined laser cutting span 186 across at least a portion of the cutting table 182. In some embodiments, the laser cutting assembly 184 is mounted at a fixed location across the cutting table 182. In other embodiments, the laser cutting assembly 184 is adjustably mounted on a movable carriage, for example, and can be repositioned along the length of the cutting table 182 in the "X" direction shown in FIG. 3 or raised and lowered in height along the "Y" direction shown in FIG. 3.

In the networked environment 100, the computing environment 110 is configured to direct the operation of the textile printer 170 and the textile cutter 180, among other equipment, to achieve continuous feed fabric printing and cutting. Generally, the textile printer 170 is configured to print patterns and other features on panels (e.g., pieces of fabric that can be sewn together into textile products, items of apparel, etc.) of a textile sheet 190 using ink. In turn, the textile cutter 180 is configured to feed the textile sheet 190 over the cutting table 182 and to cut the panels out from the textile sheet 190 using the laser cutting assembly 184 in an ongoing, continuous manner as the textile sheet 190 is fed over the cutting table 182. The structure and operation of the laser cutting assembly 184 is described in further detail below with reference to FIGS. 4, 5A, 5B, and 6.

In the networked environment 100, the computing environment 110 can be located within the same building, for example, as the textile printer 170 and the textile cutter 180. Alternatively, the networked environment 100 can be geographically dislocated, at least in part, from the textile printer 170 and the textile cutter 180 while it directs the overall operation of the textile printer 170 and the textile cutter 180 via the network 150. Thus, the network 150 facilitates two-way data and control communications between one or more of the computing environment 110, the textile printer 170, and the textile cutter 180. As referred to herein, the computing environment 110 can encompass, at least in part, hardware and/or software logic of one or more embedded control system(s) of the textile printer 170 and the textile cutter 180, for example.

In operation, the computing environment 110 is configured to collect orders for products, such as products that incorporate textile, paper, plastic, leather, rubber, and/or other materials, from the client device 160. The orders can be received over time via the network 150 in the form of (or along with) tech packs 192, for example. Once received, the orders can be stored in the apparel manufacturing data store 120 for further processing by the computing environment 110. The tech packs 192 can be embodied as digital or electronic files, such as job definition format (JDF) files, for example, that define instructions to manufacture one or more textile products. In that context, the tech packs 192 can include specifications of one or more products to be manufactured as part of one or more orders, including size specifications, order piece/assortment specifications, panel size and shape specifications, fabric type/print pattern specifications, and fastener specifications, among others. The tech packs 192 can also include a definition of one or more fabrics or fabric specifications, one or more panels (e.g., pieces, sections, portions, etc.), fabric colors, fabric print patterns or graphics, thread, weave, nap, or knit or embroidery patterns, assembly instructions, fastener definitions and/or specifications, quantities, price and/or cost limitations or requests, and other specifications of textile or other products. The tech packs 192 can be generated at any of the client devices 160 and forwarded to the computing environment 110 over the network 150.

Once received, the computing environment 110 is configured to organize orders defined by the tech packs 192 into one or more groups of orders. Generally, by aggregating orders from several client devices 160 and coordinating the manufacture and assembly processes for those orders on a relatively large scale, the networked environment 100 increases efficiency in apparel manufacturing. After the orders defined by the tech packs 192 are aggregated and organized into one or more groups of orders, the print engine 132 of the computing environment 110 is configured to arrange panels for products in a group of orders into one or more aggregated textile panel templates 194. The panels defined in an aggregated textile panel template 194 may be representative of one or more pieces, sections, or portions of fabric or other materials for one or more shirts, pants, dresses, or other accessories or items to be assembled.

The print engine 132 can aggregate the panels in the aggregated textile panel templates 194 for efficiency. For example, across orders defined in a number of tech packs 192, all panels to be cut out from the same type of fabric can be incorporated and aligned in the same aggregated textile panel template 194. In that way, fabric scrap can be reduced by aggregating and aligning multiple panels across orders defined by a number of tech packs 192. The print engine 132 is also configured to instruct the textile printer 170 to print the aggregated textile panel templates 194 onto the textile sheet 190, using ink, for example, as one or more panels. As shown in FIG. 1, the panels can be printed in any shape or form and to include various print patterns as defined in the orders.

As print patterns, for example, of the panels are printed onto the textile sheet 190 by the textile printer 170, the textile sheet 190 is fed onto the textile cutter 180. As the textile sheet 190 is fed onto the textile cutter 180, the cut engine 134 of the computing environment 110 is configured to instruct the textile cutter 180 to cut the panels out from the textile sheet 190 using the laser cutting assembly 184. As described in further detail below, the cut engine 134 is configured to identify one or more panel cutouts 188 on the textile sheet 190 with reference to the aggregated textile panel template 194, cameras, imaging devices, and/or other sensors used to identify certain features on the textile sheet 190.

The panel cutouts 188 define the outer limits or peripheral boundaries of panels or pieces of fabric to be cut out from the textile sheet 190. In some cases, the textile printer 170 can print one or more lines representative of the panel cutouts 188 on the textile sheet 190. Those lines can be identified using image processing techniques by the cut engine 134, and the cut engine 134 can direct the textile cutter 180 to cut along those lines. It is not necessary, however, that the panel cutouts 188 be visible on the textile sheet 190, because the computing environment 110 can define and track the outer limits or peripheral boundaries of panels without printed lines that define those outer limits.

As the panel cutouts 188 are identified, the cut engine 134 is further configured to track one or more points of intersection of the panel cutouts 188 with the combined laser cutting span 186 as the textile sheet 190 is fed over the cutting table 182. In other words, as the textile sheet 190 is fed over the cutting table 182, the panel cutouts 188 intersect the combined laser cutting span 186 of the laser cutting assembly 184 at certain points in time. At those points of intersection, the cut engine 134 directs the laser cutting assembly 184 to cut along the panel cutouts 188 using one or more laser beams.

The computing environment 110 is configured to generate instructions for the assembly of the textile products defined in the orders from the client devices 160 using the cut-out panels from the textile sheet 190. For example, the computing environment 110 can generate and provide assembly instructions for sewing workers on a textile assembly production line.

Figure 2:
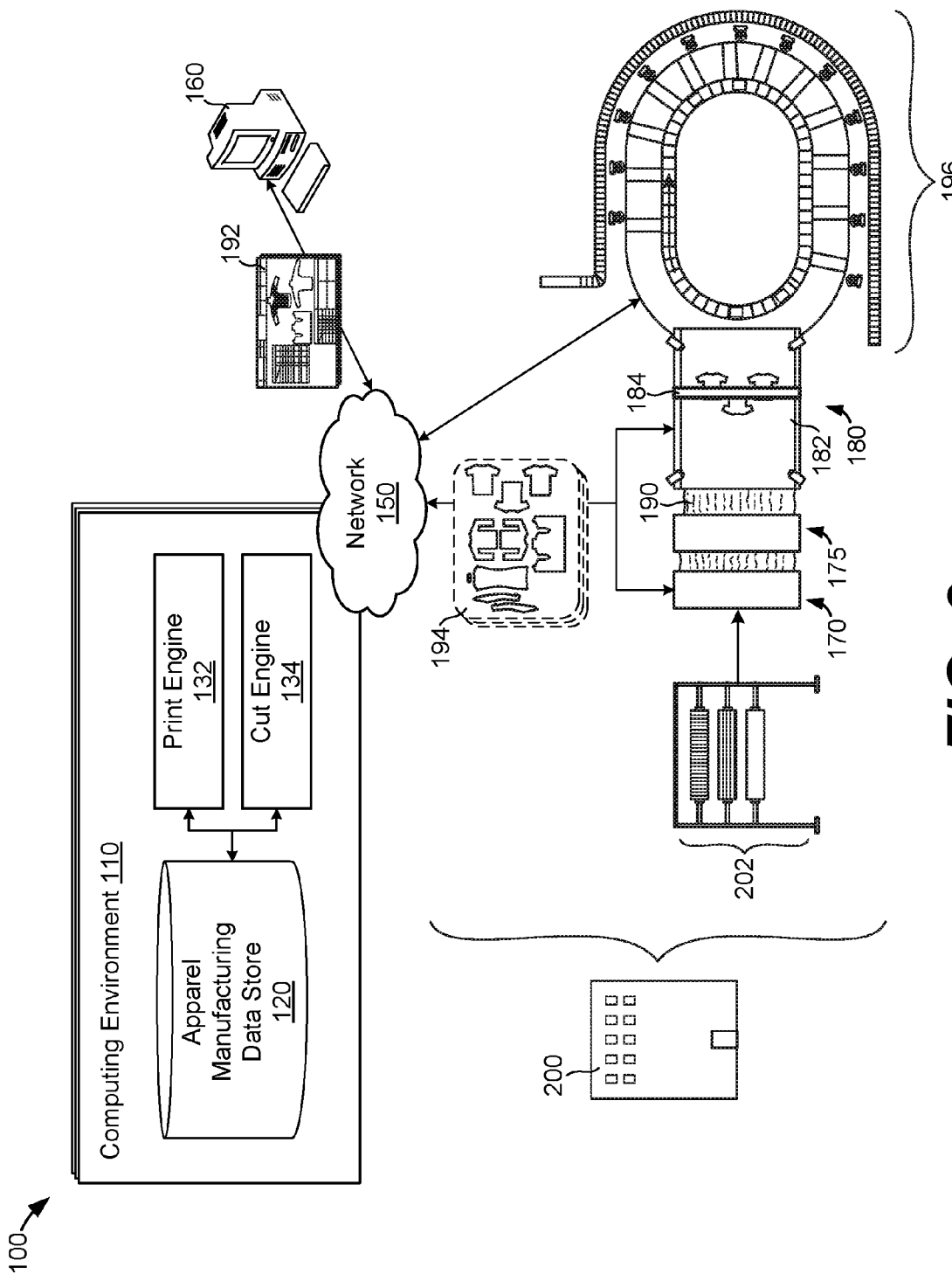
FIG. 2 illustrates a more detailed view of the networked environment for continuous fabric cutting shown in FIG. 1 according to various embodiments of the present disclosure.

FIG. 2 illustrates a more detailed view of the networked environment 100 shown in FIG. 1. In addition to the computing environment 110, the network 150, the textile printer 170, and the textile cutter 180 shown in FIG. 1, FIG. 2 further illustrates other equipment for apparel manufacturing at a facility 200. As shown in FIG. 2, the facility 200 includes a fabric inventory 202, the textile printer 170, a textile dryer 175, the textile cutter 180, and a textile production line 196. The computing environment 110 can be located at the facility 200 or geographically dislocated, at least in part, from the facility 200 while it directs the overall operation of equipment at the facility 200.

The fabric inventory 202 can be embodied as an inventory of fabric, including one or more rolls or sheets of various types of fabric. Among other types, the fabric inventory 202 can include fabrics that are woven, non-woven, knitted, netted, technical, etc., without limitation. The fabric inventory 202 can include solid and/or patterned cotton, silk, polyester or polyester blend, linen, wool, nylon, or other types of fabric. Additionally, other types of materials can also be kept in inventory, such as paper, plastic, leather, rubber, and other materials. The apparel manufacturing data store 120 can store records of the fabric inventory 202 available for processing at the facility 200, along with the specifications of the fabric inventory 202. As described in further detail below, the print engine 132 and the cut engine 134 are configured to account, at least in part, for the type of fabric being used during printing and cutting operations. For example, when printing or cutting, the print engine 132 and/or the cut engine 134 can tailor the operations of the textile printer 170 and/or the textile cutter 180 based on the thread count, weave, nap, or knit pattern(s), thickness, stretch properties, type, etc. of the fabric (and/or other materials) being used.

The textile printer 170 can be embodied as any suitable type of printer for printing on textile fabrics or other materials, such as a digital textile printer, digital garment printer, or direct-to-garment printer. Textile printing is related to textile dyeing but, rather than uniformly dyeing a fabric sheet in its entirety, textile printing involves applying one or more colors to certain parts or areas of the fabric sheet to form desired patterns. The textile printer 170 can incorporate specialized inkjet technologies, for example, to apply ink directly on fabrics in the fabric inventory 202. The textile printer 170 can apply water-based, acid, reactive, or other types of inks depending upon the type of fabric or other material being printed upon.

The textile printer 170 can receive instructions from the print engine 132 over the network 150 for printing various panels of products, panel cutouts for the panels, unique identifiers for the panels, cut alignment markers for the panels, assembly instructions for the panels, and other print features. Examples of those panels, panel cutouts, unique identifiers, cut alignment markers, assembly instructions, etc. are described in further detail in the '874 Application and in the '840 Application.

The textile dryer 175 can be embodied as any suitable type of dryer for drying ink printed on textile fabrics or other materials. The textile dryer 175 can include adjustable infrared or heat panels, for example, to dry or cure ink applied by the textile printer 170, as needed. In some embodiments, the textile dryer 175 may not be necessary based on the printing/ink technology used by the textile printer 170. Thus, the textile dryer 175 may be omitted and/or incorporated with the textile printer 170 in some embodiments. The operation of the textile dryer 175, as needed, can be controlled by the print engine 132 over the network 150.

The textile cutter 180 can be embodied as equipment that incorporates laser cutting technology to cut materials, such as textile fabrics, with one or more laser beams. As described in further detail below, the textile cutter 180 includes the cutting table 182 and a laser cutting assembly 184 that provides the combined laser cutting span 186 across at least a portion of the cutting table 182. The textile cutter 180 can include automatic, computer-controlled and/or actuated vacuums, rollers, belts, clips, hold-downs, etc., to hold and/or maneuver textile sheets, such as the textile sheet 190, and/or other materials as they are fed across the textile cutter 180 for cutting. The structure and operation of the laser cutting assembly 184 is described in further detail below with reference to FIGS. 4, 5A, 5B, and 6. As noted above, the cut engine 134 is configured to generate cut control instructions for the textile cutter 180, and the cut control instructions can be communicated to the textile cutter 180 as part of two-way control communications over the network 150.

As shown in FIG. 2, the textile sheet 190 can be fed from the textile printer 170 directly into the textile dryer 175 and, subsequently, onto the textile cutter 180. In other examples, the textile sheet 190 can be manually fed from the textile printer 170, to the textile dryer 175, and onto the textile cutter 180. In other cases, the textile sheet 190 can be directly or manually fed from the textile printer 170 onto the textile cutter 180.

The textile production line 196 can be embodied as an arrangement of one or more conveyors, totes, sewing or assembly stations, and associated drive and control systems. Once panels are cut out from the textile sheet 190 by the textile cutter 180, the panels can be placed into one or more totes of the textile production line 196 for routing along its conveyor system to the sewing or assembly stations. The operation of the textile production line 196 is described in further detail in the '874 Application, the '840 Application, and the '1640 Application.

Figure 3:
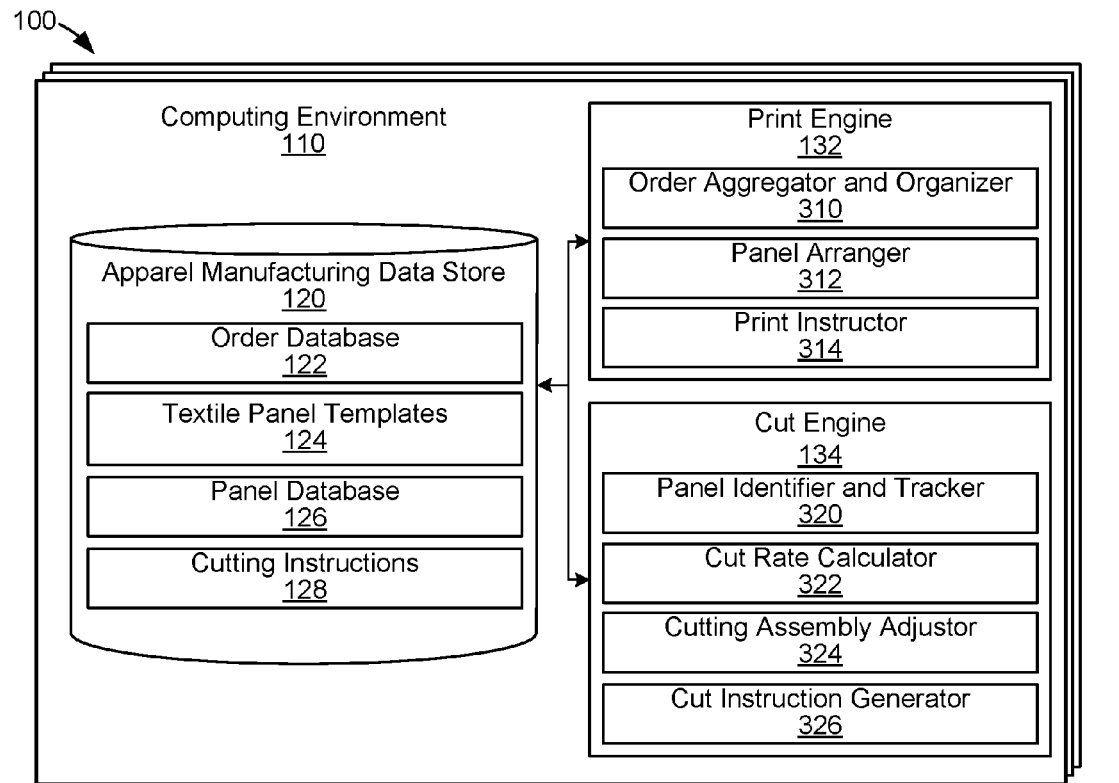
FIG. 3 illustrates a more detailed view of a computing environment for continuous fabric cutting shown in FIGS. 1 and 2 according to various embodiments of the present disclosure.
Figure 3:
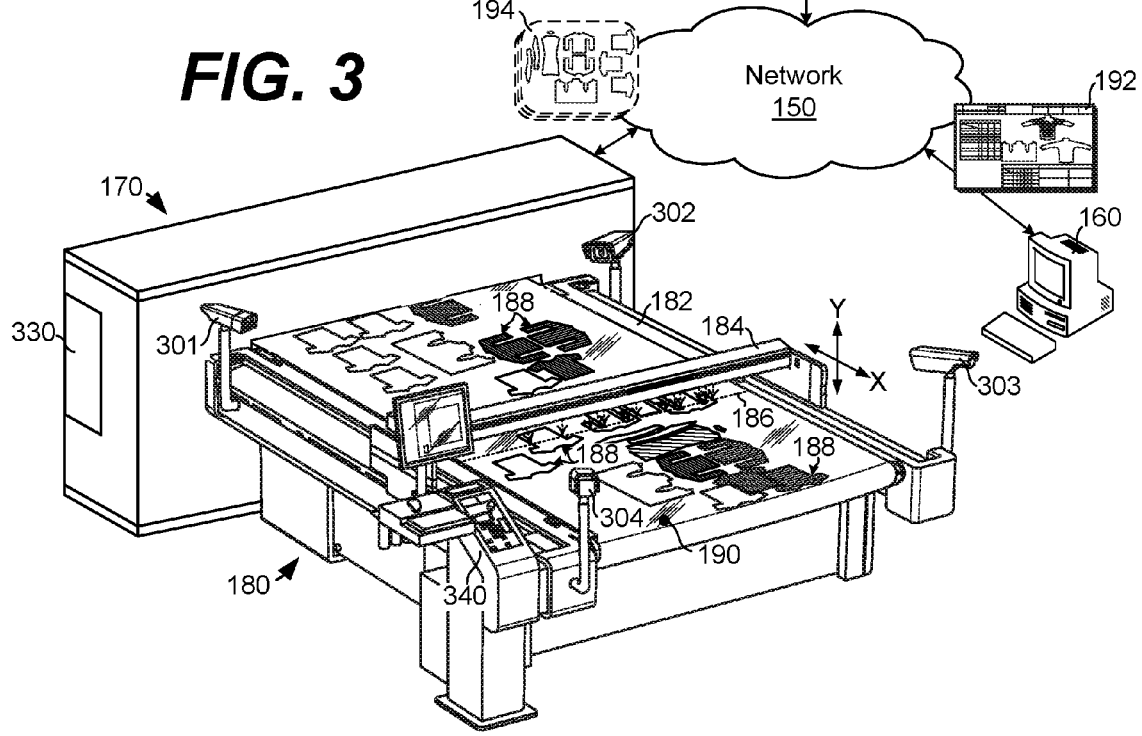

FIG. 3 illustrates a more detailed view of the computing environment 110 shown in FIGS. 1 and 2. In FIG. 3, the textile dryer 175 is omitted for simplicity. The computing environment 110 can be embodied as one or more computers, computing devices, or computing systems. In certain embodiments, the computing environment 110 can include one or more computing devices arranged, for example, in one or more server or computer banks. The computing device or devices can be located at a single installation site or distributed among different geographical locations. The computing environment 110 can include a plurality of computing devices that together embody a hosted computing resource, a grid computing resource, and/or other distributed computing arrangement. In some cases, the computing environment 110 can be embodied as an elastic computing resource where an allotted capacity of processing, network, storage, or other computing-related resources varies over time.

The computing environment 110 can also be embodied, in part, as various functional and/or logic (e.g., computer-readable instruction, device, circuit, processing circuit, etc.) elements configured to direct the computing environment 110 to perform aspects of the embodiments described herein. Additionally, because it interfaces over the network 150 with computing and/or control devices of the textile printer 170, the textile dryer 175, the textile cutter 180, and textile production line 196 through service interfaces, application programming interfaces (APIs), etc., the computing environment 110 can be embodied as a collection of computing devices that includes the computing and/or control devices (or capabilities) of the textile printer 170, the textile dryer 175, the textile cutter 180, and textile production line 196.

The network 150 can include the Internet, intranets, extranets, wide area networks (WANs), local area networks (LANs), wired networks, wireless networks, cable networks, satellite networks, other suitable networks, or any combinations thereof. It is noted that the computing environment 110 can communicate with the computing and/or control devices of the textile printer 170, the textile dryer 175, the textile cutter 180, and textile production line 196 using various systems interconnect models and/or protocols such as simple object access protocol (SOAP), representational state transfer (REST), real-time transport protocol (RTP), user datagram protocol (UDP), internet protocol (IP), transmission control protocol (TCP), and/or other protocols for communicating data over the network 150, without limitation. It is noted that the network 150 can include connections to any number of client devices or network hosts, such as the client devices 160, website servers, file servers, networked computing resources, databases, data stores, or any other network devices or computing systems.

The client devices 160 can be embodied as any type of computing devices, processing circuits, or processor-based devices or systems used by individuals, including those embodied in the forms of desktop computers, laptop computers, personal digital assistants, cellular telephones, or tablet computers, among others. The client devices 160 can also include one or more peripheral devices. In this context, the peripheral devices can include one or more input devices, such as a keyboard, keypad, touch pad, touch screen, microphone, camera, etc.

As shown in FIG. 3, the apparel manufacturing data store 120 includes memory areas for or associated with an order database 122, textile panel templates 124, a panel database 126, and cutting instructions 128. The print engine 132 includes an order aggregator and organizer 310, a panel arranger 312, and a print instructor 314. The cut engine 134 includes a panel identifier and tracker 320, a cut rate calculator 322, a cutting assembly adjustor 324, and a cut instruction generator 326.

The order database 122 includes a database of orders for textile products received from the client devices 160. In that context, the order database 122 can include a database of the tech packs 192, for example, along with any other specifications, quantities, price and/or cost limitations or requests, and other information associated with orders for products. The textile panel templates 124 can include a database of the aggregated textile panel templates 194 generated by the panel arranger 312, as described herein. The panel database 126 can include a database of all the individual panels in the aggregated textile panel templates 194, along with unique identifiers for those panels, assembly instructions associated with those panels, and other information. The cutting instructions 128 can include any computer-readable instructions generated by the cut engine 134 to direct the operation of the textile cutter 180. For example, the cutting instructions 128 can include computer-aided-manufacturing (CAM), computer numerical control (CNC), or similar computer-interpretable instructions to direct one or more laser beams generated by the laser cutting assembly 184 to cut the textile sheet 190 as described below. The apparel manufacturing data store 120 is not limited to storing the information described above, as other data can be stored for the processes of on demand apparel manufacturing described herein.

Turning to the print engine 132, the order aggregator and organizer 310 is configured to organize orders received from the client devices 160 into one or more groups of orders based on one or more productivity or efficiency factors, such as size, shape, fabric type, delivery location, etc. of the products defined by the orders, with reference to the tech packs 192 that define the specifications of the orders.

The panel arranger 312 is configured to arrange panels for textile products contained in a group of orders into one or more aggregated textile panel templates 194 which can be stored as the textile panel templates 124 in the apparel manufacturing data store 120 and used to prepare control instructions for the textile printer 170 and/or the textile cutter 180. The panels in an aggregated textile panel template 194 can be representative of one or more textile panels or pieces of fabric or other materials from which shirts, pants, dresses, or other articles of clothing or accessories can be manufactured. When arranging various panels from orders, the panel arranger 312 can closely align the panels among each other to the extent possible to reduce scrap in textile sheets. Additionally or alternatively, the panel arranger 312 can align the panels to avoid large lengths of intersection between the panel cutouts 188 and the combined laser cutting span 186. In case of such large intersections, it may be necessary to decrease the cutting rate of the textile sheet 190, slowing cutting operations. The panel arranger 312 can generate the aggregated textile panel templates 194, at least in part, in a computer-readable file format. Thus, the aggregated textile panel templates 194 can be provided, in relevant part(s), as instructions from the computing environment 110 to the textile printer 170 and/or the textile cutter 180 over the network 150.

The print instructor 314 is configured to coordinate the printing operations of the textile printer 170 over the network 150. For example, the print instructor 314 can generate print instructions based on the aggregated textile panel templates 194 and forward them to the textile printer 170. Additionally, the print instructor 314 can monitor the ongoing printing operations of the textile printer 170. In that context, the print instructor 314 can identify printing errors, printing delays, printing rates, and other printing-related activities and factors at the textile printer 170 based on the two-way data and control communications between the computing environment 110 and the textile printer 170. In that way, the print instructor 314 can coordinate printing operations along with the cutting operations coordinated and directed by the cut engine 134.

Turning to the cut engine 134, the panel identifier and tracker 320 is configured to identify one or more panel cutouts 188 on the textile sheet 190 as it is being fed over the cutting table 182. In one example case, the panel identifier and tracker 320 is configured to identify all panel cutouts 188 associated with all panels on the textile sheet 190, and to track those panel cutouts 188 as the textile sheet 190 is fed over the cutting table 182. With that information, the cut instruction generator 326 can instruct the laser cutting assembly 184 to cut the textile sheet 190 along the panel cutouts 188 over time. To identify the panel cutouts 188, the panel identifier and tracker 320 can rely on various types of information, such as still images and/or video of the textile sheet 190 on the cutting table 182, the aggregated textile panel templates 194, printing feedback or printing rate information from the textile printer 170, and feed rate information for the textile cutter 180, for example, among other information.

Thus, the panel identifier and tracker 320 can capture images of the textile sheet 190 as it is being fed across the cutting table 182. In that context, the textile cutter 180 includes an arrangement of cameras or imaging devices 301-304 to capture images and/or video of the textile sheet 190 as it is being fed across the cutting table 182 and cut by the laser cutting assembly 184. The cameras 301-304 can be placed around the cutting table 182 and, in some embodiments, additional cameras can be present in the laser cutting assembly 184 as described below. The cameras in the laser cutting assembly 184 can provide a close-up view of the textile sheet 190 as it approaches and is cut by the laser cutting assembly 184.

The cameras 301-304 can include any suitable type of image sensor capable of capturing the details of the textile sheet 190 and/or printed on the textile sheet 190. In one embodiment, the cameras 301-304 can include high-resolution image sensors capable of capturing thread or weave patterns in the textile sheet 190, as well as fine details printed on the textile sheet 190 by the textile printer 170. In one embodiment, the cameras 301-304 can include image sensors capable of capturing the reflection of long wave ultraviolet ("UV") light. In that case, the cameras 301-304 can also include UV light sources that cast UV light upon the textile sheet 190. In that way, UV light reflected by washable, UV-reflective inks on the textile sheet 190 can be captured in images using the cameras 301-304. Further, by comparing the images of the textile sheet 190 with the aggregated textile panel templates 194 used by the textile printer 170 to print panels on the textile sheet, for example, the panel identifier and tracker 320 can confirm the positions of the panel cutouts 188.

The panel identifier and tracker 320 is also configured to determine points of intersection of the panel cutouts 188 with the combined laser cutting span 186, over time, as the textile sheet 190 is fed over the cutting table 182. In other words, the panel identifier and tracker 320 can determine where and when the panel cutouts 188 will intersect with the combined laser cutting span 186. As described in further detail below with reference to FIG. 4, the combined laser cutting span 186 is representative of a region across cutting table 182 along which the laser cutting assembly 184 can cut the textile sheet 190 using one or more laser beams. At those points of intersection over time, the cut instruction generator 326 can instruct the laser cutting assembly 184 to direct one or more laser beams upon the textile sheet 190 and cut panels out from the textile sheet 190 along the panel cutouts 188. The panel identifier and tracker 320 can determine those points of intersection over time based at least in part on a shape of the panel cutouts 188 and a feed rate of the textile sheet 190 across the cutting table 182, among other information. In addition to identifying the panel cutouts 188 and determining the points of intersection, the panel identifier and tracker 320 can also track those intersections as a function of the shape of the panel cutouts 188 and the feed rate of the textile sheet 190.

In other aspects, the panel identifier and tracker 320 can also identify certain factors to control the manner in which the textile sheet 190 is cut by the laser cutting assembly 184. These cut control factors can be identified or determined based on the images of the textile sheet 190, information in the aggregated textile panel template 194, fabric specification information stored in the apparel manufacturing data store 120, or other information. For example, a textile thread, weave, nap, or knit of the textile sheet 190 and/or inadvertent deformation (e.g., stretching, bunching, etc.) of the textile sheet 190, for example, can be identified by the panel identifier and tracker 320 from the images of the textile sheet 190 captured by the cameras 301-304. The panel identifier and tracker 320 can refer to that information to control the manner in which the textile sheet 190 is cut by the laser cutting assembly 184.

The cut rate calculator 322 is configured to calculate a cutting rate at which the laser cutting assembly 184 is capable of cutting the textile sheet 190 based on a power level of one or more laser beams generated by the laser cutting assembly 184 and the material properties of the textile sheet 190. For example, if the textile sheet 190 is formed from polyester, the laser cutting assembly 184 may be able to cut it more quickly using a laser than if the textile sheet 190 is formed from cotton. Thus, the cut rate calculator 322 calculates the cutting rate as one factor to control the operation of the textile cutter 180. For example, depending upon the cutting rate, among other factors, the cut engine 134 can control the feed rate of the textile sheet 190 across the cutting table 182, to ensure that each panel is completely cut out from the textile sheet 190.

In some cases, it may be beneficial to directly control certain operating parameters of the laser cutting assembly 184. For example, if the cutting rate indicates that cutting a certain length of one of the panel cutouts 188 is expected to take an unacceptable amount of time (e.g., too long of a time), it may be necessary to vary operating parameters of the laser cutting assembly 184 to increase the cutting rate and reduce the cutting time. The cutting assembly adjustor 324 can identify or anticipate the need to control operating parameters of the laser cutting assembly 184, such as laser power level, laser cutting span, and laser cutting span overlap, among other parameters. The operations of the cutting assembly adjustor 324 are described in further detail below with reference to FIGS. 6 and 7.

The cut instruction generator 326 is configured to generate cut control instructions to control the operation of the textile cutter 180. For example, the cut instruction generator 326 can provide instructions to control the feed rate of the textile sheet 190 across the cutting table 182 and instructions to control the cutting operations performed by the laser cutting assembly 184. The cut control instructions can include CAM, CNC, or similar computer-interpretable instructions to direct one or more laser beams generated by the laser cutting assembly 184 to cut the textile sheet 190 as described herein.

After they are generated, the cut instruction generator 326 can forward the cut control instructions to the textile cutter 180 over the network 150. The cut instruction generator 326 is also configured to adapt the cut control instructions over time and during cutting operations based on feedback from the panel identifier and tracker 320. By capturing images the textile sheet 190 using the cameras 301-304 after print patterns have been printed on the textile sheet 190 by the textile printer 170 and adjusting the cut control instructions provided to the textile cutter 180 using feedback gathered from the images, the cut instruction generator 326 can dynamically adjust the cutting operations performed by the textile cutter 180.

As also shown in FIG. 3, the textile printer 170 includes a controller 330 that directs the operation of the textile printer 170. The controller 330 can be embodied as any suitable combination of analog, digital, or analog and digital processing circuitry, including memory, such as a programmable logic controller, configured to control the operation of the textile printer 170. Thus, the controller 330 can be embodied as a collection of logic, software, and/or hardware that directs the textile printer 170 to perform various printing operations. The controller 330 also includes the physical and logical interfaces for two-way control communications with the computing environment 110 over the network 150, such as physical layer network interfaces, service interfaces, APIs, etc.

The textile cutter 180 also includes a controller 340 that directs the operation of the textile cutter 180. The controller 340 can be embodied as any suitable combination of analog, digital, or analog and digital processing circuitry, including memory, such as a programmable logic controller, configured to control the operation of the textile cutter 180. Thus, the controller 340 can be embodied as a collection of logic, software, and/or hardware that directs the textile cutter 180 to perform various cutting operations. The controller 340 also includes the physical and logical interfaces for two-way control communications with the computing environment 110 over the network 150, such as physical layer network interfaces, service interfaces, APIs, etc.

Figure 4:
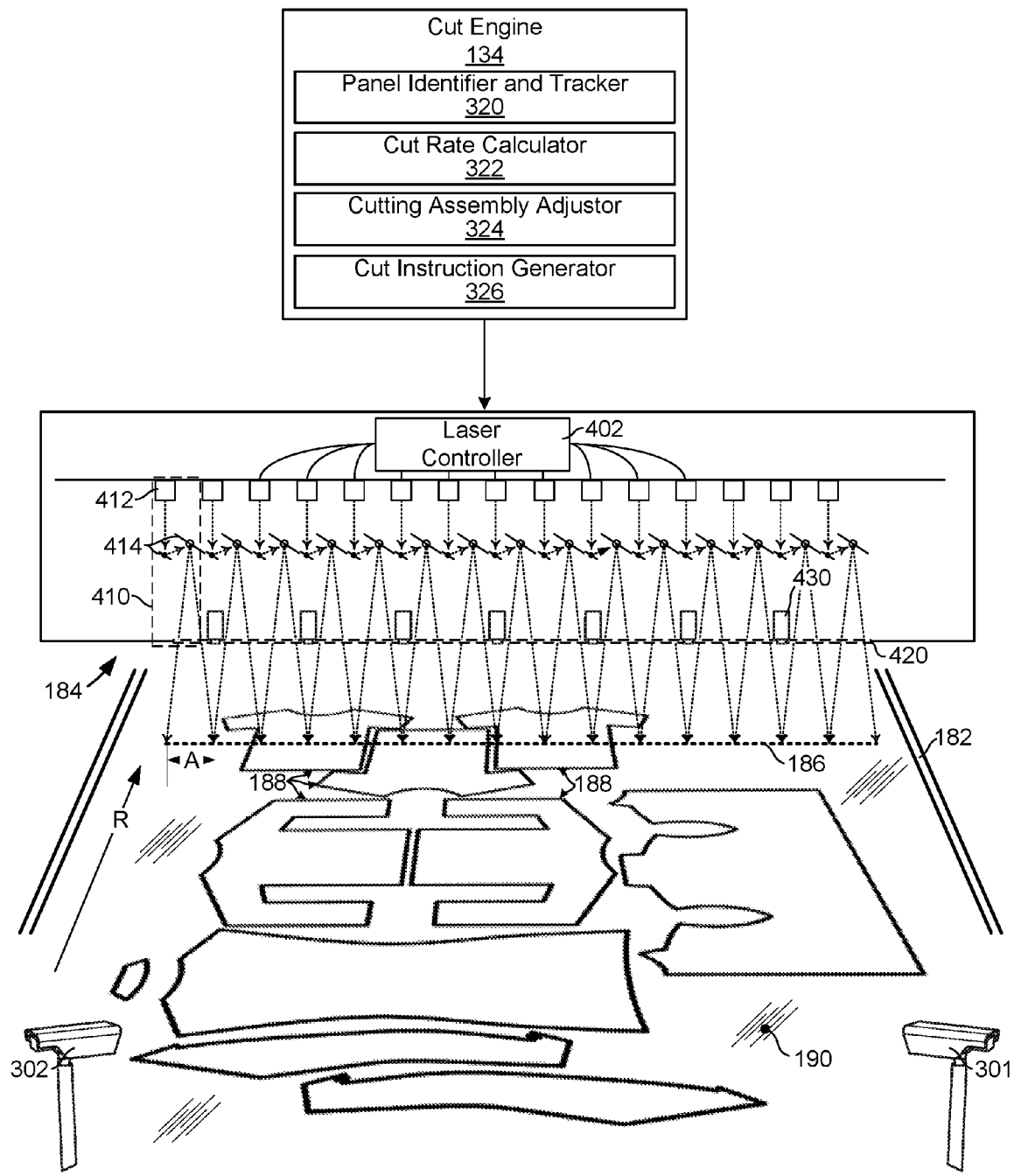
FIG. 4 illustrates a representative example of a laser cutting assembly of a textile cutter shown in FIGS. 1-3 according to various embodiments of the present disclosure.

FIG. 4 illustrates a representative example of the laser cutting assembly 184 of the textile cutter 180 shown in FIGS. 1-3. The illustration in FIG. 4 is provided as an example and is not drawn to scale. Further, the example is not intended to show every component or arrangement of components that can be relied upon to implement the concepts described herein. Within the scope of the embodiments, other electro-mechanical arrangements of lasers, mirrors, optics, lenses, fiber optics, and other components can be used to cut the textile sheet 190 along the combined laser cutting span 186.

As shown, the laser cutting assembly 184 includes a laser controller 402, a set of laser cut modules 410 arranged in a row, and a set of cameras or imaging devices 430 directed toward the cutting table 182. Among other components, each laser cut module 410 includes a laser source 412 to generate a laser beam and one or more pivotable mirrors 414 to sweep the laser beam over a cutting span "A" across a portion of the combined laser cutting span 186. Collectively, the laser beams of each of the laser cut modules 410 align to form the combined laser cutting span 186 of the laser cutting assembly 184. Over the combined laser cutting span 186, the laser cut modules 410 can direct laser beams to certain locations upon the textile sheet 190. At those locations, the laser beams can cut out panels from the textile sheet 190 along the panel cutouts 188. In various embodiments, the cutting spans of the laser cut modules 410 may or may not overlap in part with each other along the combined laser cutting span 186. As described below, the cutting spans can be made to overlap to increase the cutting rate along certain lengths of the panel cutouts 188.

Each of the laser sources 412 can be embodied as a suitable laser for cutting materials consistent with the concepts described herein. In certain embodiments, the laser sources 412 can be a combined laser source as described below. Among other types of lasers, the laser sources 412 can be embodied as carbon dioxide, neodymium, neodymium yttrium-aluminium-garnet, fiber, or other types of lasers. The laser sources 412 can include power sources, cooling systems, optics, gas or pressurized gas systems, and other components to generate laser beams. Among other configurations, the laser cutting assembly 184 can be configured for vaporization cutting, in which focused laser beams heat and erode the textile sheet 190 during cutting processes, or for blow-cutting, in which high-pressure gas is blown over the textile sheet 190 as the laser beams heat the textile sheet 190.

The laser controller 402 can be embodied as any suitable combination of analog, digital, or analog and digital processing circuitry configured to control the operation of the laser cutting assembly 184. The laser controller 402 is configured to control the operation of the laser sources 412 and the pivotable mirrors 414, among other components, to direct one or more laser beams over the combined laser cutting span 186. The laser controller 402 can direct the laser beams to locations or points of intersection of the combined laser cutting span 186 with the panel cutouts 188. For example, based on instructions from the cut instruction generator 326, the laser controller 402 can direct the laser beams to the panel cutouts 188 as a function of the shapes of the panel cutouts 188 and a feed rate "R" of the textile sheet 190 across the cutting table 182. In some embodiments, the laser controller 402 includes a large laser source, and laser energy from that large laser source is directed, in parts, to the laser sources 412 through fiber optic cables or other suitable means. Alternatively, each of the laser sources 412 can be embodied as a separate laser source under the control of the laser controller 402.

The laser beams generated by the laser sources 412 can exit the laser cutting assembly 184 through a slit or opening 420. In some cases, the slit or opening 420 can be embodied as a row of individual openings for each of the laser cut modules 410. The slit or opening 420 can also include one or more collimating lenses or other optical elements to help focus laser energy, or optical elements to stretch or expand individual cutting spans "A" associated with each laser cut module 410. The housing of the laser cutting assembly 184 can be internally-cooled and/or pressurized. If pressurized, air can be forced out from the slit or opening 420 to assist with cutting operations. To achieve a similar effect, the laser cutting assembly 184 can include one or more pressurized jets that force air and assist with cutting operations by blowing away cut materials.

As shown, the laser cutting assembly 184 includes the cameras 430 to capture images and/or video of the textile sheet 190 as it is fed across the cutting table 182. The cameras 430 can capture close-up images of the textile sheet 190 during cutting operations, and the panel identifier and tracker 320 can process those images to identify and track the panel cutouts 188 and the cutting operations as described herein.

Figure 5A:
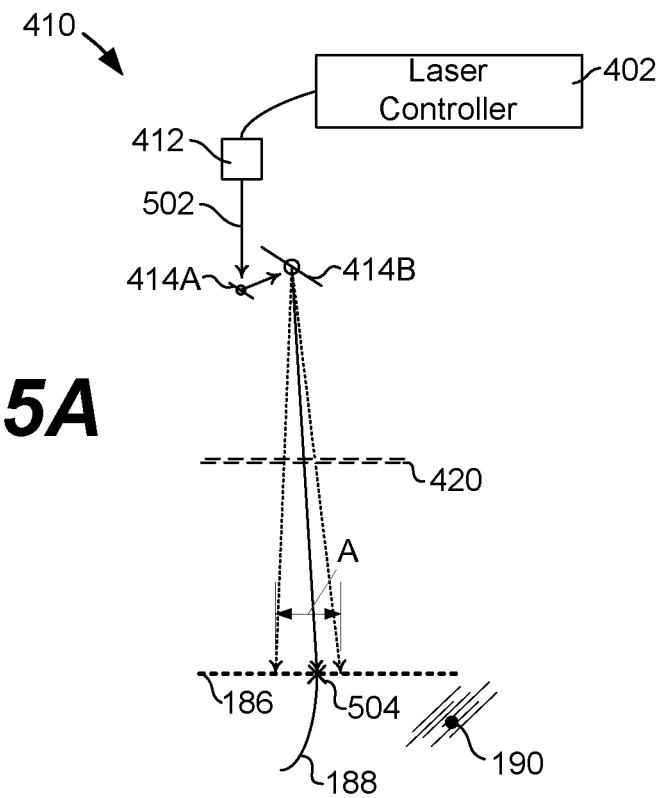
FIG. 5A illustrates components of a laser cut module of the laser cutting assembly shown in FIG. 4 according to various embodiments of the present disclosure.

FIG. 5A illustrates components of a laser cut module 410 of the laser cutting assembly 184 shown in FIG. 4. In addition to the laser source 412 and the slit or opening 420, the pivotable mirrors 414A and 414B are individually referenced. The illustration of the laser cut module 410 in FIG. 5A is representative of certain components that can be relied upon. Other suitable components and arrangements of components, including various electro-mechanical arrangements of lasers, mirrors, optics, lenses, fiber optics, and other components can be used in the laser cut modules 410.

The pivotable mirrors 414A and 414B can be embodied as any suitable mirrors and can be articulated (e.g., pivoted, rotated, vibrated, swept, etc.) using motors, for example, or other suitable mechanisms directed by the laser controller 402. When a laser beam 502 is emitted from the laser source 412, the pivotable mirror 414A can be pivoted to reflect the laser beam 502 towards or away from the mirror 414B. When reflected towards the mirror 414B, the mirror 414B can be pivoted to reflect the laser beam 502 through the slit or opening 420 and toward the textile sheet 190. Further, the mirror 414B can be pivoted over time to sweep, move, or reposition the laser beam 502 to various positions over the cutting span "A" of the combined laser cutting span 186. By repositioning the laser beam 502 over the cutting span "A", the laser beam 502 can be focused to intersect with (and track or follow) the panel cutout 188 as it intersects with the combined laser cutting span 186 over time.

When the laser beam 502 is reflected away from the mirror 414B by mirror 414A, the laser cut module 410 can be turned off, in effect, because the laser beam 502 can no longer be reflected down to the textile sheet 190. In various embodiments, any given laser cut module 410 in the laser cutting assembly 184 can be turned off by diverting laser beams using mirrors, for example, or by powering off individual laser sources. In other words, the laser source 412, if embodied as a separate laser source, can be powered down by the laser controller 402 to turn off the laser beam 502. Thus, in various ways, the laser beam 502 can be reflected away from the textile sheet 190 and/or turned off as necessary during cutting operations.

Figure 5B:
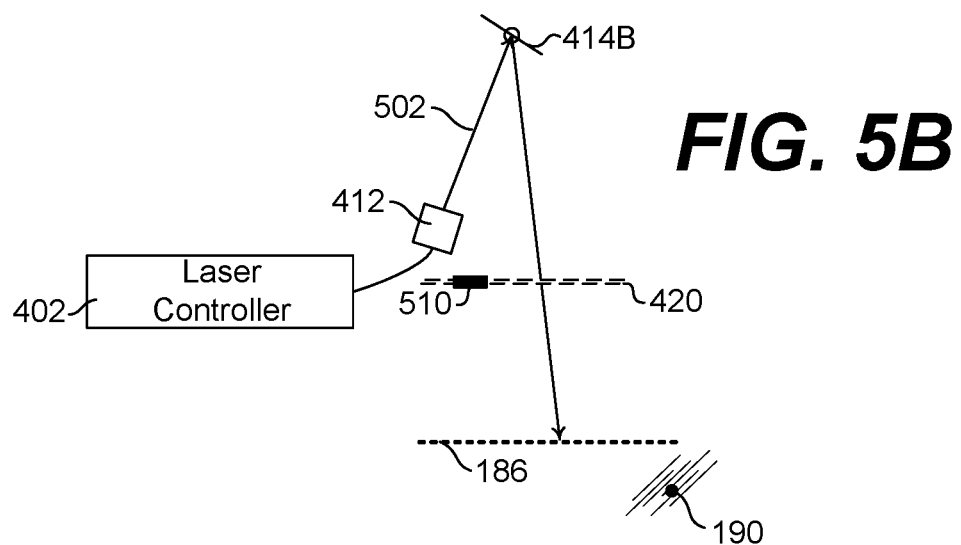
FIG. 5B illustrates components of another example laser cut module of the laser cutting assembly shown in FIG. 4 according to various embodiments of the present disclosure.

FIG. 5B illustrates another example laser cut module of the laser cutting assembly 184 shown in FIG. 4. In the example shown in FIG. 5B, the laser source 412 is positioned to direct the laser beam 502 at the mirror 414B, and the mirror 414A is omitted. In this case, rather than diverting the laser beam 502 away from the mirror 414B using the mirror 414A, the laser source 412 can be powered down to stop cutting. Alternatively, to prevent the laser beam 502 from reaching the textile sheet 190, the mirror 414B can be pivoted to direct the laser beam 502 at an angle onto an absorption plate 510. Similar to the example shown in FIG. 5A, the example shown in FIG. 5B is not intended to be limiting of the arrangements of components that can be relied upon to implement the concepts described herein.

Within the scope of the embodiments, other electro-mechanical arrangements of lasers, mirrors, optics, lenses, fiber optics, and other components can be used to direct one or more laser beams for cutting. In one embodiment, the laser cutting assembly 184 can be embodied by directly pivoting the laser sources 412, and mirrors, such as the mirrors 414A and 414B, can be omitted. In that case, one or more of the laser sources 412 can be articulated (e.g., pivoted, rotated, vibrated, swept, etc.) using motors or other suitable mechanisms directed by the laser controller 402. Additionally, the laser cutting assembly 184 can be embodied so that the laser sources 412 and/or mirrors 414 can direct laser beams to areas on the textile sheet 190 beyond the combined laser cutting span 186. In other words, using an assembly of mirrors that can be articulated over more than one axis of freedom, for example, the laser cutting assembly 184 directs laser beams in both length-wise and width-wise directions over the textile sheet 190. In that way, the laser cutting assembly 184 can cut panels out from the textile sheet 190 at locations other than (e.g., beyond) those aligned along the combined laser cutting span 186.

Figure 6:
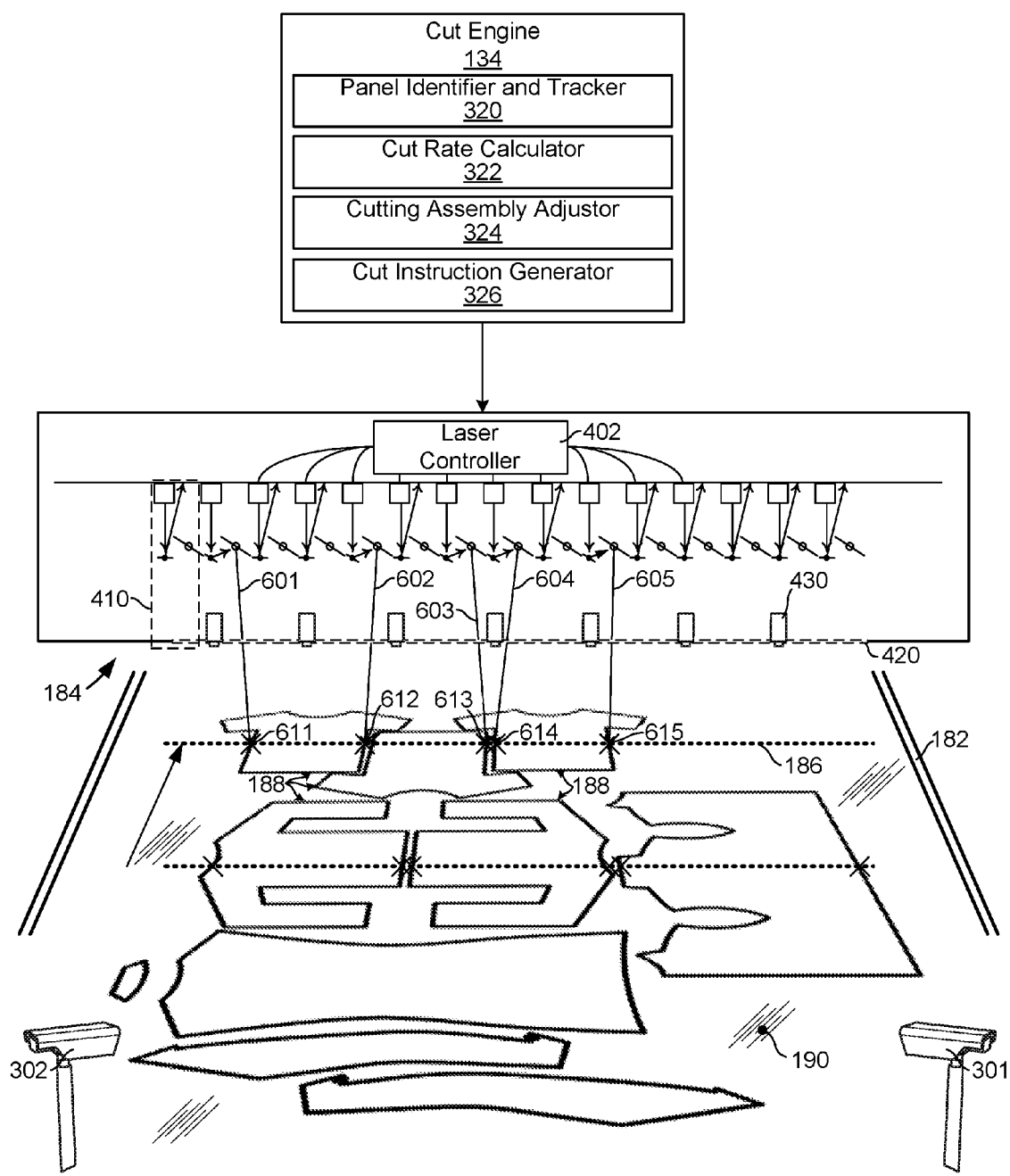
FIG. 6 illustrates a representative example of cutting operations performed by the laser cutting assembly shown in FIG. 4 according to various embodiments of the present disclosure.

FIG. 6 illustrates a representative example of cutting operations performed by the laser cutting assembly 184. As shown in FIG. 6, laser beams 601-605 are directed onto the textile sheet 190, respectively, at points of intersection 611-615 with the panel cutouts 188. As described herein, the cut instruction generator 326 generates and forwards the instructions to the laser controller 402 to direct the laser beams 601-605 to the points of intersection 611-615. Further, as the textile sheet 190 is fed across the cutting table 182, the panel identifier and tracker 320 identifies the panel cutouts 188 as feedback information for the cut instruction generator 326 to generate cut control instructions. To identify the panel cutouts 188, the panel identifier and tracker 320 can rely on various types of information, such as still images and/or video of the textile sheet 190 captured by the cameras 301-304 and/or the cameras 430 and the aggregated textile panel templates 194. The panel identifier and tracker 320 can also track the intersections 611-615 as a function of the shape of the panel cutouts 188, printing feedback or printing rate information from the textile printer 170, and the feed rate of the textile sheet 190 on the textile cutter 180, for example, among other information. In that way, the cut engine 134 can direct the laser beams 601-605 to track the points of intersection 611-615 during cutting processes, as the textile sheet 190 is continuously fed over the cutting table 182.

While the panel identifier and tracker 320 tracks the intersections 611-615, the cut rate calculator 322 is configured to calculate a cutting rate at which the laser cutting assembly 184 is capable of cutting the textile sheet 190. The cut rate calculator 322 can calculate the cutting rate based on power levels of the laser beams 601-605 and the material properties of the textile sheet 190. For example, if the textile sheet 190 is formed from polyester, the laser cutting assembly 184 may be able to cut it more quickly using the laser beams 601-605 than if the textile sheet 190 is formed from cotton. The cut rate calculator 322 calculates the cutting rate as one factor to control the operation of the laser cutting assembly 184.

Based on the cutting rate, the cutting assembly adjustor 324 can determine whether, along any length of the panel cutouts 188, the cutting rate is insufficient to cut the panel cutouts 188 out from the textile sheet 190. If the cutting rate is insufficient, the cutting assembly adjustor 324 can adjust some operating aspects of the laser cutting assembly 184 and/or the textile cutter 180 to increase the cutting rate. The cutting assembly adjustor 324 can identify or anticipate the need to control operating parameters of the laser cutting assembly 184 to increase the cutting rate in an ongoing fashion over time.

Examples of operating parameters that can be adjusted to change the cutting rate include the power level of the laser beams 601-605, the laser cutting span of the laser cut modules 410, individually, and the potential overlap of the cutting spans of the laser cut modules 410. In one case, the laser cutting span of one or more of the laser cut modules 410 can be increased or decreased by increasing the pivot range of one or more mirrors in the laser cutting assembly 184. In that way, the laser cutting span of adjacent laser cut modules 410 can be made to overlap, focusing more energy on a smaller area of the textile sheet 190 to increase the cutting rate. In another example, the laser cutting assembly 184 can be raised (and lowered) using a mechanical assembly to increase (or decrease) the laser cutting span of the laser cut modules 410. Where the cutting rate cannot be increased to a level needed to cut the textile sheet 190 along some length of the panel cutouts 188, the cut instruction generator 326 can decrease the feed rate of the textile sheet 190. Similarly, when the cutting rate is sufficient to cut the textile sheet 190 quickly, the cut instruction generator 326 can increase the feed rate of the textile sheet 190. Thus, the feed rate of the textile sheet 190 over the cutting table 182 can vary over time.

As noted above, as compared to other cutting systems in which a textile sheet cannot be continuously fed across a cutting table during cutting operations, the laser cutting assemblies described herein can be used to provide continuous fabric cutting as a textile sheet is being fed across a cutting table. The cutting table and laser cutting assembly can be relied upon to cut various panels out from a larger textile sheet at a faster rate than other systems, increasing the throughput and reducing costs for apparel manufacturing processes.

Figure 7A:
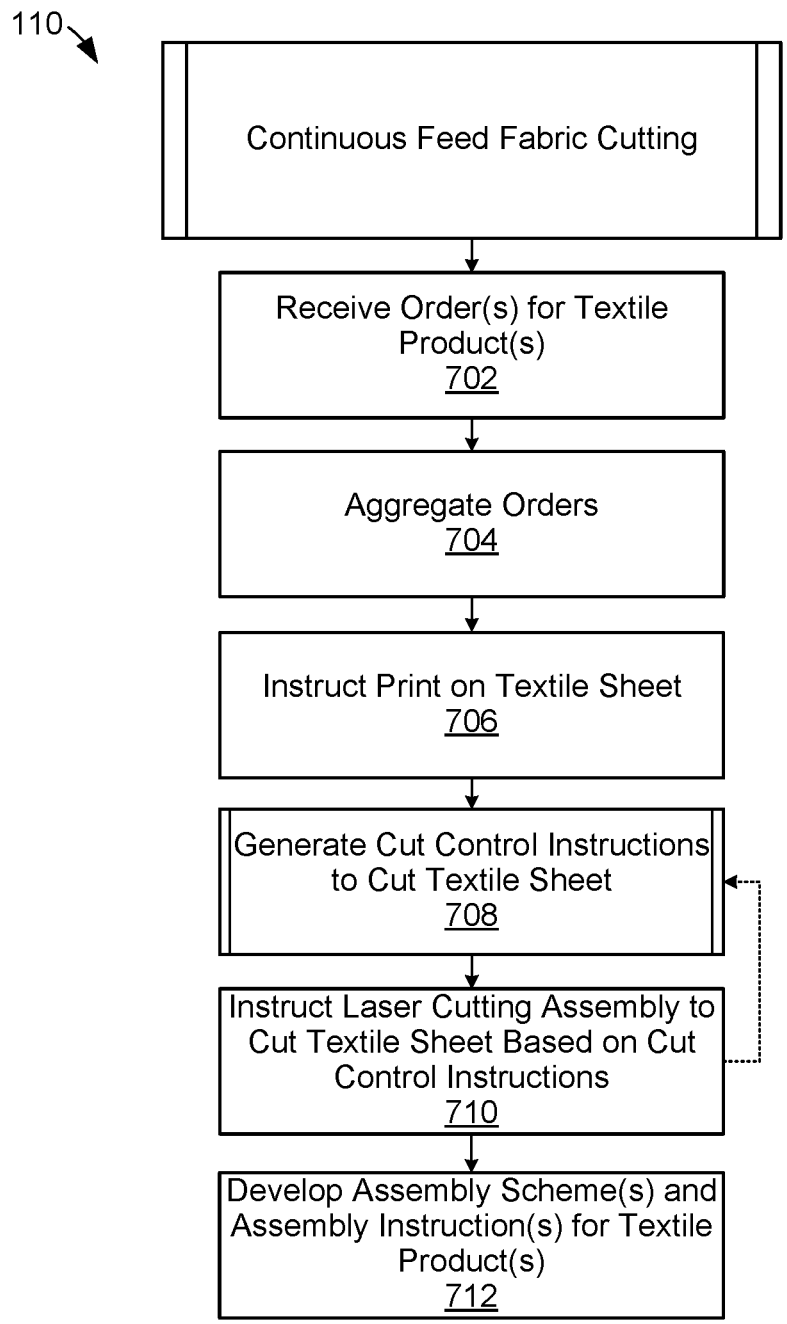
FIG. 7A illustrates an example process for on demand apparel manufacturing according to various embodiments of the present disclosure.
Figure 7B:
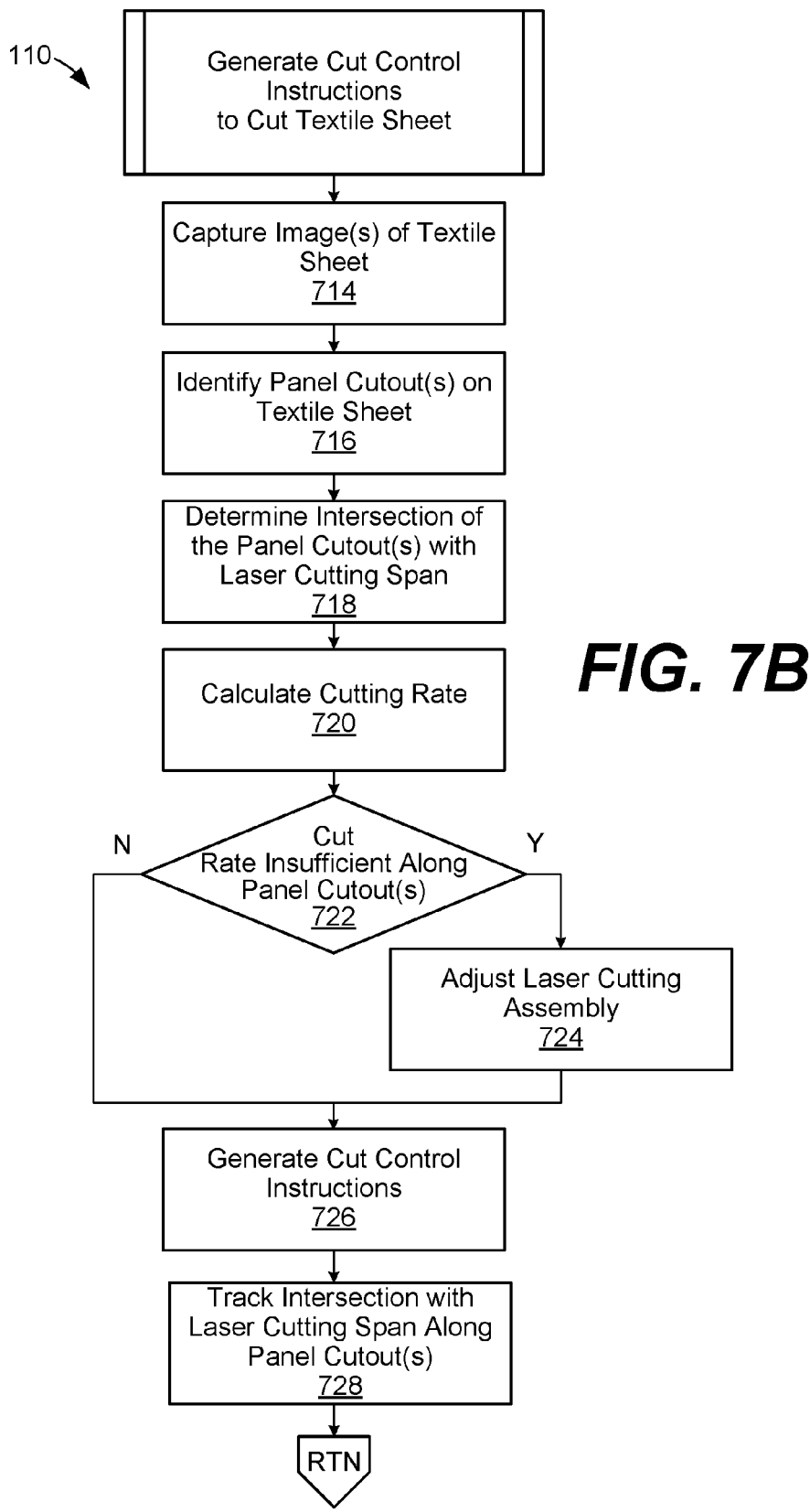
FIG. 7B further illustrates the example process for on demand apparel manufacturing in FIG. 7A according to various embodiments of the present disclosure.

Turning to FIGS. 7A and 7B, a process of continuous feed fabric cutting is illustrated. The flowchart shown in FIGS. 7A and 7B can be viewed as depicting an example group of steps performed by the computing environment 110 according to one or more embodiments. It should be appreciated that the flowchart shown in FIGS. 7A and 7B provides only one example of a functional sequence or arrangement that can be employed to implement the operations of the computing environment 110 described herein. Additionally, although the process is described in connection with the computing environment 110, other computing environments can perform the process illustrated in FIGS. 7A and 7B.

At reference numeral 702, the process includes the computing environment 110 receiving orders for products, such as various textile products. The orders can be received from the client devices 160 over the network 150 and stored in the apparel manufacturing data store 120. As described herein, the orders can be defined, at least in part, by one or more tech packs 192 received from the client devices 160. At reference numeral 704, the process includes the computing environment 110 aggregating the orders over time. By aggregating orders from various geographic locations and coordinating apparel assembly processes for those orders, increased efficiency in apparel manufacturing can be achieved. When aggregating orders, the print engine 132 can arrange panels for textile products into one or more aggregated textile panel templates. For example, the panel arranger 312 can arrange panels for textile products into the aggregated textile panel template 194 as described herein.

At reference numeral 706, the process includes the print engine 132 instructing the textile printer 170 to print panels for textile products on a textile sheet. For example, the print instructor 314 can instruct the textile printer 170 to print panels for textile products, along with any print features related to the panels, such as print patterns, panel cutouts, cut alignment markers, etc., upon the textile sheet 190 as described herein. The print instructor 314 can also coordinate the printing operations of the textile printer 170 with the textile cutter 180 over the network 150. In that context, the print instructor 314 can monitor the ongoing printing operations of the textile printer 170 to provide feedback information to the cut engine 134.

At reference numeral 708, the process includes the cut engine 134 generating cut control instructions for the textile cutter 180 to cut out the panels printed at reference numeral 706. For example, the cut instruction generator 326 can generate cut control instructions for the textile cutter 180 to cut out the panels along the panel cutouts 188 as described herein. The generation of cut control instructions for the textile cutter 180 is described in further detail below with reference to FIG. 7B.

At reference numeral 710, the process includes the cut instruction generator 326 instructing the laser cutting assembly 184 of the textile cutter 180 to cut the panel cutouts 188 where they intersect with the combined laser cutting span 186. The cut control instructions can include CAM, CNC, or similar computer-interpretable instructions to direct the laser beams generated by the laser cutting assembly 184 to cut the textile sheet 190. The cut instruction generator 326 can communicate the cut control instructions to the textile cutter 180 as part of two-way control communications over the network 150. As shown in FIG. 7A, the processes at reference numerals 708 and 710 can continue during cutting operations for all panels being cut.

At reference numeral 712, the process includes the computing environment 110 developing an assembly scheme using the panels cut out at reference numeral 710. For example, the computing environment 110 can generate an assembly scheme including an ordered set of instructions for the assembly of textile products using the panels as described in the '874 Application and in the '840 Application.

FIG. 7B illustrates an example process for the generation of cut control instructions according to various embodiments of the present disclosure. The process illustrated in FIG. 7B corresponds to those processes at reference numerals 708 and 710 in FIG. 7A. At reference numeral 714, the process includes the panel identifier and tracker 320 capturing one or more images of the textile sheet 190 on the textile cutter 180. For example, the panel identifier and tracker 320 can direct the cameras 301-304 and 430 of the textile cutter 180 to capture images of the textile sheet 190 as it is being fed over and cut by the textile cutter 180.

At reference numeral 716, the process includes the panel identifier and tracker 320 identifying the panel cutouts 188 on the textile sheet 190. To identify the panel cutouts 188, the panel identifier and tracker 320 can reference images and/or video of the textile sheet 190 on the cutting table 182, the aggregated textile panel templates 194, printing feedback or printing rate information from the textile printer 170, or feed rate information for the textile cutter 180, for example, among other information.

At reference numeral 718, the process includes determining one or more points of intersection between the panel cutouts 188 and the combined laser cutting span 186. The panel identifier and tracker 320 can determine the points of intersection over time as the textile sheet 190 is fed over the cutting table 182. In other words, the panel identifier and tracker 320 can determine where and when the panel cutouts 188 will intersect with the combined laser cutting span 186. The points and times of intersection can be provided to the cut instruction generator 326 as information for laser cutting control as described herein.

At reference numeral 720, the process includes the cut rate calculator 322 calculating a cutting rate for the laser cutting assembly 184 based on a power level of one or more laser beams generated by the laser cutting assembly 184 and the material properties of the textile sheet 190. For example, if the textile sheet 190 is formed from polyester, the laser cutting assembly 184 may be able to cut it more quickly using a laser than if the textile sheet 190 is formed from cotton. Thus, the cut rate calculator 322 calculates the cutting rate as one factor to control the operation of the textile cutter 180 as described herein.

At reference numeral 722, the process includes the cutting assembly adjustor 324 determining whether, along any length of the panel cutouts 188, the cutting rate is insufficient to cut the panel cutouts 188 out from the textile sheet 190. If the cutting rate is insufficient, the cutting assembly adjustor 324 can adjust one or more operating parameters of the laser cutting assembly 184 and/or the textile cutter 180 at reference numeral 724 to increase the cutting rate. Examples of operating parameters that can be adjusted include the power level of the laser beams 601-605, the laser cutting span of the laser cut modules 410, and the overlap of the cutting spans of the laser cut modules 410. In one case, the laser cutting span of one or more of the laser cut modules 410 can be increased or decreased by increasing the pivot range of one or more mirrors in the laser cutting assembly 184. In that way, the laser cutting span of adjacent laser cut modules 410 can be made to overlap, focusing more energy on a smaller area of the textile sheet 190 to increase the cutting rate. In another example, the laser cutting assembly 184 can be raised (and lowered) in height along the "Y" direction shown in FIG. 3 using a mechanical assembly to increase (or decrease) the laser cutting span of the laser cut modules 410. Similarly, the laser cutting assembly 184 can be repositioned along the length of the cutting table 182 in the "X" direction shown in FIG. 3, as needed. Where the cutting rate cannot be increased to a level needed to cut the textile sheet 190 along some length of the panel cutouts 188, the cut instruction generator 326 can decrease the feed rate of the textile sheet 190. On the other hand, if the cutting rate is sufficient, the process can proceed to reference numeral 726.

At reference numeral 726, the process includes the cut instruction generator 326 generating cut control instructions to cut panels out from the textile sheet 190 using the textile cutter 180. In the generation of the cut control instructions, the cut instruction generator 326 can refer to various types of information. For example, the cut instruction generator 326 can refer to the panel cutout, panel cutout intersection, and cutting rate information determined by the panel identifier and tracker 320 and the cut rate calculator 322 at reference numerals 716, 718, and 720. Further, the cut instruction generator 326 can refer to the aggregated textile panel templates, specifications of the textile sheets (e.g., the type, thickness, grade, weave pattern, thread count, etc.) being cut, and other data stored in the apparel manufacturing data store 120.

At reference numeral 728, the process includes the panel identifier and tracker 320 tracking one or more points of intersection of the panel cutouts 188 with the combined laser cutting span 186 as the textile sheet 190 is fed over the cutting table 182. The panel identifier and tracker 320 can track the points of intersection as a function of the shape of the panel cutouts 188, printing feedback or printing rate information from the textile printer 170, and the feed rate of the textile sheet 190 on the textile cutter 180, for example, among other information. In that way, the cut engine 134 can direct laser beams for cutting as the textile sheet 190 is continuously fed over the cutting table 182. The cut instruction generator 326 can adapt the cut control instructions over time during the cutting operations based on the tracking at reference numeral 728. After tracking at reference numeral 728, the process returns to reference numeral 710 and/or 712 in FIG. 7A.

Figure 8:
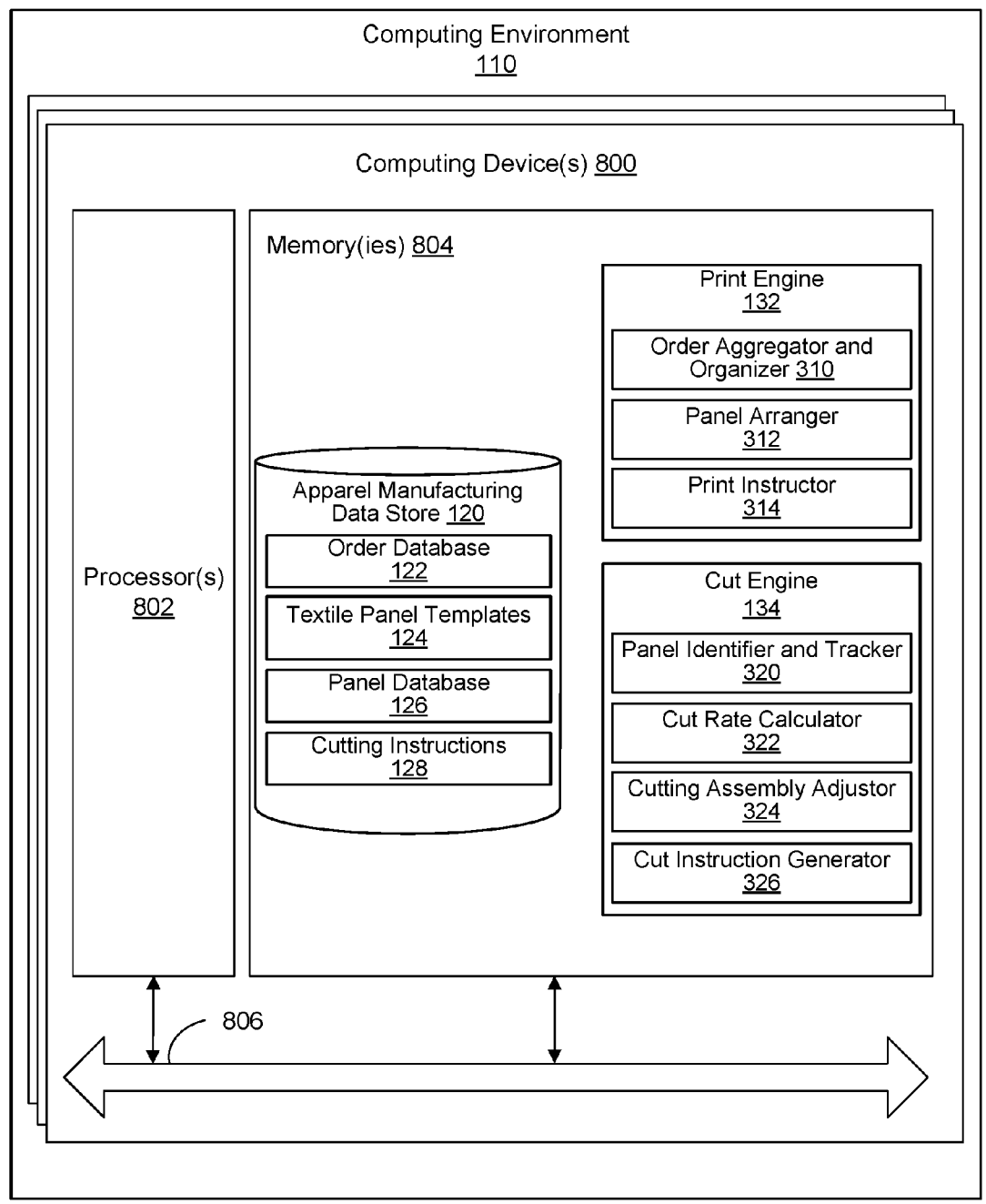
FIG. 8 illustrates an example schematic block diagram of the computing environment employed in the networked environment shown in FIG. 1 according to various embodiments of the present disclosure.

FIG. 8 illustrates an example schematic block diagram of the computing environment 110 employed in the networked environment 100 in FIGS. 1-3 according to various embodiments of the present disclosure. The computing environment 110 includes one or more computing devices 800. Each computing device 800 includes at least one processing system, for example, having a processor 802 and a memory 804, both of which are electrically and communicatively coupled to a local interface 806. To this end, each computing device 800 can be embodied as, for example, at least one server computer or similar device. The local interface 806 can be embodied as, for example, a data bus with an accompanying address/control bus or other bus structure as can be appreciated.

In various embodiments, the memory 804 stores data and software or executable-code components executable by the processor 802. For example, the memory 804 can store executable-code components associated with the print engine 132 and the cut engine 134 for execution by the processor 802. The memory 804 can also store data such as that stored in the apparel manufacturing data store 120, among other data.

It should be understood and appreciated that the memory 804 can store other executable-code components for execution by the processor 802. For example, an operating system can be stored in the memory 804 for execution by the processor 802. Where any component discussed herein is implemented in the form of software, any one of a number of programming languages can be employed such as, for example, C, C++, C#, Objective C, Java®, JavaScript®, Perl, PHP, Visual Basic®, Python®, Ruby, Flash®, or other programming languages.

As discussed above, the memory 804 stores software for execution by the processor 802. In this respect, the terms "executable" or "for execution" refer to software forms that can ultimately be run or executed by the processor 802, whether in source, object, machine, or other form. Examples of executable programs include, for example, a compiled program that can be translated into a machine code format and loaded into a random access portion of the memory 804 and executed by the processor 802, source code that can be expressed in an object code format and loaded into a random access portion of the memory 804 and executed by the processor 802, or source code that can be interpreted by another executable program to generate instructions in a random access portion of the memory 804 and executed by the processor 802, etc. An executable program can be stored in any portion or component of the memory 804 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 804 can include both volatile and nonvolatile memory and data storage components. Volatile components are those that do not retain data values upon loss of power. Nonvolatile components are those that retain data upon a loss of power. Thus, the memory 804 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

Also, the processor 802 can represent multiple processors 802 and/or multiple processor cores and the memory 804 can represent multiple memories that operate in parallel, respectively, or in combination. Thus, the local interface 806 can be an appropriate network or bus that facilitates communication between any two of the multiple processors 802, between any processor 802 and any of the memories 804, or between any two of the memories 804, etc. The local interface 806 can include additional systems designed to coordinate this communication, including, for example, a load balancer that performs load balancing.

As discussed above, the print engine 132 and the cut engine 134 can be embodied, in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts or process diagrams of FIGS. 7A and 7B are representative of certain processes, functionality, and operations of embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 802. The machine code can be converted from the source code, etc. Further, each block can represent, or be connected with, a circuit or a number of interconnected circuits to implement a certain logical function or process step.

Although the flowcharts or process diagrams of FIGS. 7A and 7B illustrate a specific order, it is understood that the order can differ from that which is depicted. For example, an order of execution of two or more blocks can be scrambled relative to the order shown. Also, two or more blocks shown in succession in FIGS. 7A and 7B can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the print engine 132 and the cut engine 134, that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIGS. 7A and 7B. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
 a textile cutter comprising a cutting table and a laser cutting assembly, the laser cutting assembly comprising a plurality of laser cut modules arranged in a row and configured to provide a combined laser cutting span across at least a portion of the cutting table, a laser cut module among the plurality of laser cut modules being configured to sweep a laser beam across a portion of the combined laser cutting span; and
 at least one computing device communicatively coupled to the textile cutter over a network and configured to perform a method comprising:
  identifying, by the at least one computing device, a panel cutout on a textile sheet over the cutting table;
  determining, by the at least one computing device, a timing at which the panel cutout will intersect with the combined laser cutting span based at least in part on a shape of the panel cutout and a feed rate of the textile sheet across the cutting table;

tracking, by the at least one computing device, the panel cutout along the cutting table based at least in part on the feed rate; and instructing, by the at least one computing device, the laser cutting assembly to cut the panel cutout at the timing at which the panel cutout will intersect with the combined laser cutting span.

2. The system according to claim 1, wherein:

the laser cut module comprises a pivotable mirror configured to sweep the laser beam over a cutting span across the portion of the combined laser cutting span; and the cutting span of the laser cut module overlaps with a cutting span of another one of the plurality of laser cut modules.

3. The system according to claim 1, wherein the at least one computing device is further configured to perform the method comprising:

calculating, by the at least one computing device, a cutting rate for the laser cutting assembly based at least in part on a power level of the laser beam and a type of the textile sheet;

determining, by the at least one computing device, that the cutting rate is insufficient to cut the panel cutout from the textile sheet with the laser beam along any length of the panel cutout; and adjusting, by the at least one computing device, the laser cutting assembly to increase the cutting rate in response to the determination that the cutting rate is insufficient.

4. A method, comprising:

capturing, by at least one computing device, an image of a textile sheet over a cutting table of a textile cutter;

identifying, by the at least one computing device, a panel cutout on the textile sheet;

determining, by the at least one computing device, a timing at which the panel cutout will intersect with a combined laser cutting span of a laser cutting assembly of the cutting table;

tracking, by the at least one computing device, the panel cutout based at least in part on a feed rate of the textile sheet across the cutting table; and instructing, by the at least one computing device, the laser cutting assembly to cut the panel cutout at the timing at which the panel cutout will intersect with the combined laser cutting span.

5. The method according to claim 4, wherein identifying the panel cutout on the textile sheet comprises identifying, by the at least one computing device, the panel cutout based at least in part on the image of the textile sheet and an aggregated textile panel template that defines a location of the panel cutout on the textile sheet.

6. The method according to claim 4, wherein determining the timing at which the panel cutout will intersect with the combined laser cutting span comprises determining a plurality of intersections of the panel cutout with the combined laser cutting span at the timing based at least in part on a shape of the panel cutout.

7. The method according to claim 4, wherein:

the laser cutting assembly comprises a plurality of laser cut modules configured to provide the combined laser cutting span and an imaging device directed toward the cutting table; and tracking the timing at which the panel cutout will intersect with the combined laser cutting span comprises tracking, by the at least one computing device, a plurality of intersections of the panel cutout with the combined laser cutting span based at least in part on the image of the textile sheet captured using the imaging device.

8. The method according to claim 4, further comprising calculating, by the at least one computing device, a cutting rate for the laser cutting assembly based at least in part on a power level of a laser beam generated by the laser cutting assembly.

9. The method according to claim 8, further comprising determining, by the at least one computing device, that the cutting rate is insufficient to cut the panel cutout with the combined laser cutting span.

10. The method according to claim 9, further comprising adjusting, by the at least one computing device, the laser cutting assembly to increase the cutting rate in response to the determination that the cutting rate is insufficient.

11. The method according to claim 10, wherein adjusting the laser cutting assembly comprises adjusting at least one of the power level of the laser beam generated by the laser cutting assembly, a position of the laser cutting assembly, or the feed rate of the textile sheet across the cutting table.

12. A system, comprising:

a textile cutter comprising a cutting table; and a laser cutting assembly mounted over the cutting table, the laser cutting assembly comprising:

a plurality of laser cut modules configured to provide a combined laser cutting span across at least a portion of the cutting table;

an imaging device directed toward the cutting table; and a laser controller configured to direct an operation of the plurality of laser cut modules to cut a textile sheet on the cutting table at a timing at which a panel cutout printed on the textile sheet will intersect with the combined laser cutting span using a laser beam.

13. The system according to claim 12, wherein individual ones of the plurality of laser cut modules provide respective cutting spans along at least the portion of the cutting table.

14. The system according to claim 12, wherein individual ones of the plurality of laser cut modules provide respective cutting spans that overlap at least in part across at least the portion of the cutting table.

15. The system according to claim 12, wherein:

the laser cutting assembly comprises a laser source configured to generate the laser beam; and a laser cut module of the plurality of laser cut modules comprises a first pivotable mirror to reflect and sweep the laser beam over a portion of the combined laser cutting span.

16. The system according to claim 15, wherein the laser cut module further comprises a second pivotable mirror configured to redirect the laser beam from the laser source toward or away from the first pivotable mirror.

17. The system according to claim 12, wherein the system further includes at least one computing device configured to perform a method comprising:

identifying, by the at least one computing device, the panel cutout on the textile sheet over the cutting table using an image captured by the imaging device;

determining, by the at least one computing device, the timing at which the panel cutout will intersect with the combined laser cutting span based at least in part on a shape of the panel cutout and a feed rate of the textile sheet across the cutting table; and instructing, by the at least one computing device, the laser controller to cut the panel cutout at the timing at which the panel cutout will intersect with the combined laser cutting span.

18. The system according to claim 17, wherein the at least one computing device is further configured to perform the method comprising calculating, by the at least one computing device, a cutting rate for the laser cutting assembly based at least in part on a power level of the laser beam generated by a laser source of the laser cutting assembly and a type of the textile sheet.

19. The system according to claim 18, wherein the at least one computing device is further configured to perform the method comprising determining, by the at least one computing device, that the cutting rate is insufficient to cut the panel cutout out from the textile sheet with the laser beam.

20. The system according to claim 19, wherein the at least one computing device is further configured to perform the method comprising adjusting, by the at least one computing device, at least one of the power level of the laser beam generated by the laser cutting assembly, a position of the laser cutting assembly, or the feed rate of the textile sheet across the cutting table to increase the cutting rate in response to the determination that the cutting rate is insufficient.

* * * * *